US011920651B2

(12) United States Patent
Onishi et al.

(10) Patent No.: US 11,920,651 B2
(45) Date of Patent: Mar. 5, 2024

(54) BRACKET

(71) Applicant: Prospira Corporation, Kawasaki (JP)

(72) Inventors: Tadashi Onishi, Tokyo (JP); Masato Kobayashi, Tokyo (JP)

(73) Assignee: Prospira Corporation, Kawasaki (JP)

( * ) Notice: Subject to any disclaimer, the term of this patent is extended or adjusted under 35 U.S.C. 154(b) by 401 days.

(21) Appl. No.: 17/312,936

(22) PCT Filed: Nov. 18, 2019

(86) PCT No.: PCT/JP2019/045141
§ 371 (c)(1),
(2) Date: Jun. 11, 2021

(87) PCT Pub. No.: WO2020/129514
PCT Pub. Date: Jun. 25, 2020

(65) Prior Publication Data
US 2022/0042568 A1 Feb. 10, 2022

(30) Foreign Application Priority Data
Dec. 20, 2018 (JP) .................................. 2018-238381

(51) Int. Cl.
*F16F 1/38* (2006.01)
(52) U.S. Cl.
CPC .................................. *F16F 1/3849* (2013.01)
(58) Field of Classification Search
CPC .. F16F 1/3849; F16F 15/08; F16F 1/36; F16F 7/00; B60K 5/1208; B60K 5/12
(Continued)

(56) References Cited

U.S. PATENT DOCUMENTS 9,931,923 B2 4/2018 Oki et al.
2010/0264570 A1* 10/2010 Thierry ................. F16F 13/103
267/141

(Continued)

FOREIGN PATENT DOCUMENTS

CN 101031734 A 9/2007
CN 201143945 Y 11/2008
(Continued)

OTHER PUBLICATIONS

Sep. 1, 2022, search result of the Extended European Search Report issued by the European Patent Office in the corresponding European Patent Application No. 19898784.4.
(Continued)

*Primary Examiner* — Christopher Garft
(74) *Attorney, Agent, or Firm* — KENJA IP LAW PC

(57) ABSTRACT

Provided is a bracket that has excellent durability while curbing an increase in weight. A bracket (1A) that has an opening (A) is made of a resin and is a tubular bracket, which has a pair of column portions (11) and a pair of bridging portions (12), in which the opening (A) is defined by the column portions (11) and the bridging portions (12). A plate portion (13) is included in at least one of the column portions (11), and in one of the bridging portions (12), a width (W1) of a bracket outer circumferential side outer surface (12/1) of the bridging portion (12) in an opening penetrating direction is maximum at an extending direction end (12*e*) of the bridging portion (12) in a view in an extending direction of the column portions (11).

15 Claims, 6 Drawing Sheets

(58) Field of Classification Search
USPC .......................................................... 248/674
See application file for complete search history.

(56) References Cited

U.S. PATENT DOCUMENTS

| | | | | |
|---|---|---|---|---|
| 2015/0276010 | A1* | 10/2015 | Nakamura | F16F 15/08 |
| | | | | 248/634 |
| 2017/0036526 | A1* | 2/2017 | Horseman | B60K 5/1208 |
| 2017/0074348 | A1* | 3/2017 | Okajima | F16F 1/3849 |
| 2017/0341500 | A1* | 11/2017 | Oki | F16F 13/103 |
| 2019/0113100 | A1* | 4/2019 | Shimada | B60K 5/1291 |
| 2019/0291561 | A1* | 9/2019 | Nozaki | F16F 15/08 |

FOREIGN PATENT DOCUMENTS

| | | |
|---|---|---|
| EP | 2706257 A2 | 3/2014 |
| JP | 2005048838 A | 2/2005 |
| JP | 2010001909 A | 1/2010 |
| JP | 2013167264 A | 8/2013 |
| JP | 2014163487 A | 9/2014 |

OTHER PUBLICATIONS

Jun. 16, 2021, International Preliminary Report on Patentability issued in the International Patent Application No. PCT/JP2019/045141.

Jan. 28, 2020, International Search Report issued in the International Patent Application No. PCT/JP2019/045141.

May 20, 2022, search result of Office Action issued by the China National Intellectual Property Administration in the corresponding Chinese Patent Application No. 201980084433.0.

* cited by examiner

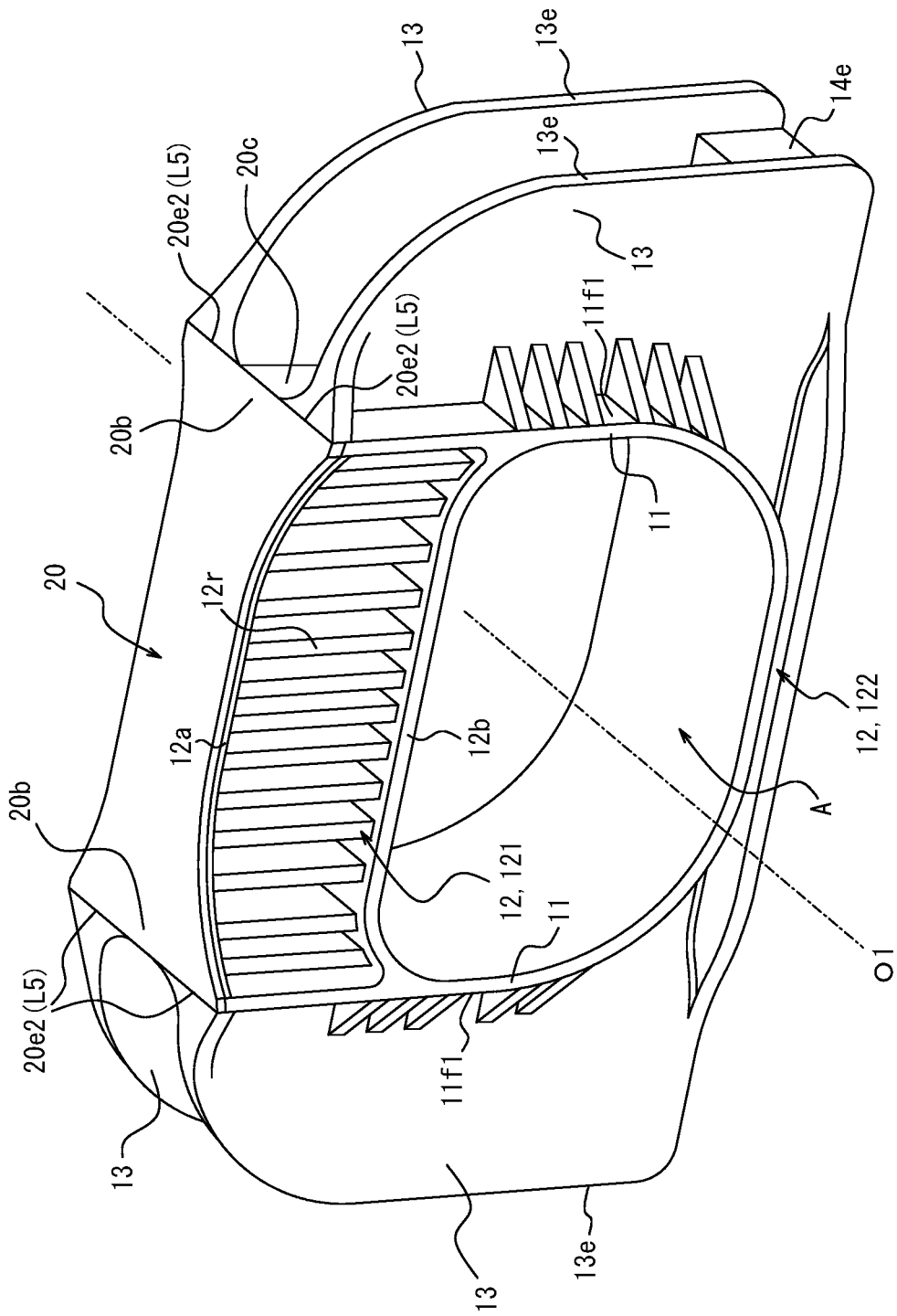

BRACKET

TECHNICAL FIELD

The present disclosure relates to a bracket that has an opening for attaching an anti-vibration member coupled on one of a vibration generating side and a vibration receiving side and is able to be coupled on the other one of the vibration generating side and the vibration receiving side.

BACKGROUND

As a bracket in the related art, there is a bracket that is obtained by bonding a reinforcing member to a synthetic resin material and has an outer circumferential surface with a reinforcing rib formed thereon (see PTL 1, for example). According to the bracket described in PTL 1, it is possible to achieve the bracket that exhibits high strength and a high fatigue resistance and thus to improve durability of the bracket by adding the reinforcing rib along with the reinforcing member.

CITATION LIST

Patent Literature

PTL 1: Japanese Patent Laid-Open No. 2013-167264

SUMMARY

Technical Problem

However, there is a concern that the bracket described in Patent Literature 1 leads to an increase in weight by the amount corresponding to the reinforcing rib, and there is room for further improvement.

An object of the present disclosure is to provide a bracket that has excellent durability while curbing an increasing in weight.

Solution to Problem

A bracket according to the present disclosure is a bracket that has an opening for attaching an anti-vibration member coupled on one of a vibration generating side and a vibration receiving side and is able to be coupled on the other one of the vibration generating side and the vibration receiving side, in which: the bracket is made of a resin; the bracket is a tubular bracket, which has a pair of column portions arranged with an interval therebetween and a pair of bridging portions arranged between the pair of column portions and coupling the pair of column portions, in which the opening is defined by the pair of column portions and the pair of bridging portions; the bracket includes a plate portion that extends on a bracket outer circumferential side outer side surface of at least one column portion of the pair of column portions all over the column portion in an extending direction of the column portion and that projects in an extending direction of the bridging portions beyond the column portion; and in one bridging portion of the pair of bridging portions, a width of a bracket outer circumferential side outer surface of the one bridging portion in an opening penetrating direction is maximum at an extending direction end of the bridging portion on a side of the one column portion in a view in an extending direction of the column portions. According to the bracket of the present disclosure, a bracket that has excellent durability while curbing an increase in weight is achieved.

In the bracket according to the present disclosure, the width of the bracket outer circumferential side outer surface of the one bridging portion in the opening penetrating direction preferably becomes narrower from the extending direction end of the bridging portion toward a center of the bridging portion in the extending direction of the bridging portion in the view in the extending direction of the column portions. In this case, it is possible to curb an increase in weight while securing strength at connecting portions between the column portions and the bridging portions on which a stress is likely to concentrate when a load is input to the bracket.

In the bracket according to the present disclosure, one opening penetrating direction side contour line of a pair of opening penetrating direction side contour lines forming an outline of the bracket outer circumferential side outer surface of the one bridging portion in a side of the opening penetrating direction is preferably a curve having a depression going toward the other opening penetrating direction side contour line of the pair of opening penetrating direction side contour lines from the extending direction end of the bridging portion toward the center of the bridging portion in the extending direction of the bridging portion in the view in the extending direction of the column portions. In this case, it is possible to curb an increase in weight while curbing stress concentration that may be caused on the one opening penetrating direction side contour line of the bridging portion where there are many weld lines, that are strength degraded sites, formed at portions where resin flows separate from and meet each other during injection molding, by smoothly reducing the width in the opening penetrating direction.

In the bracket according to the present disclosure, the other opening penetrating direction side contour line of the bracket outer circumferential side outer surface of the one bridging portion is preferably a curve having a depression going toward the one opening penetrating direction side contour line from the extending direction end of the bridging portion toward the center of the bridging portion in the extending direction of the bridging portion in the view in the extending direction of the column portions. In this case, it is possible to curb an increase in weight while curbing stress concentration that may be caused on the other opening penetrating direction side contour line of the bridging portion, by smoothly reducing the width in the opening penetrating direction.

In the bracket according to the present disclosure, in the view in the extending direction of the column portions, a depth of the depression of the one opening penetrating direction side contour line in the opening penetrating direction is preferably different from a depth of the depression of the other opening penetrating direction side contour line in the opening penetrating direction in the bracket outer circumferential side outer surface of the one bridging portion. In this case, a bracket that has more excellent durability is achieved.

In the bracket according to the present disclosure, the other bridging portion of the pair of bridging portions preferably further includes a flange portion that projects at least from a bracket outer circumferential side outer side surface of the one column portion on an extension of the other bridging portion in the extending direction of the other bridging portion, and the flange portion and the plate portion are preferably coupled to each other. In this case, a bracket that has more excellent durability is achieved.

The bracket according to the present disclosure preferably further includes a reinforcing portion on the bracket outer circumferential side outer surface of the one bridging portion. In this case, a bracket that has more excellent durability is achieved.

In the bracket according to the present disclosure, the reinforcing portion preferably has an inclined end that is inclined in a tapered manner in a direction from the one bridging portion toward the plate portion in the view in the extending direction of the column portions. In this case, a bracket that has more excellent durability is achieved.

In the bracket according to the present disclosure, the reinforcing portion preferably further extends from the tapered part in the extending direction of the column portions between the plate portions. In this case, a bracket that has more excellent durability is achieved.

Advantageous Effect

According to the present disclosure, it is possible to provide a bracket that has excellent durability while curbing an increase in weight.

BRIEF DESCRIPTION OF THE DRAWINGS

In the accompanying drawings:

FIG. 6 is a perspective view schematically illustrating a bracket according to a second embodiment of the present disclosure.

DETAILED DESCRIPTION

Hereinafter, brackets according to some embodiments of the present disclosure will be described with reference to the drawings.

Figure 1:
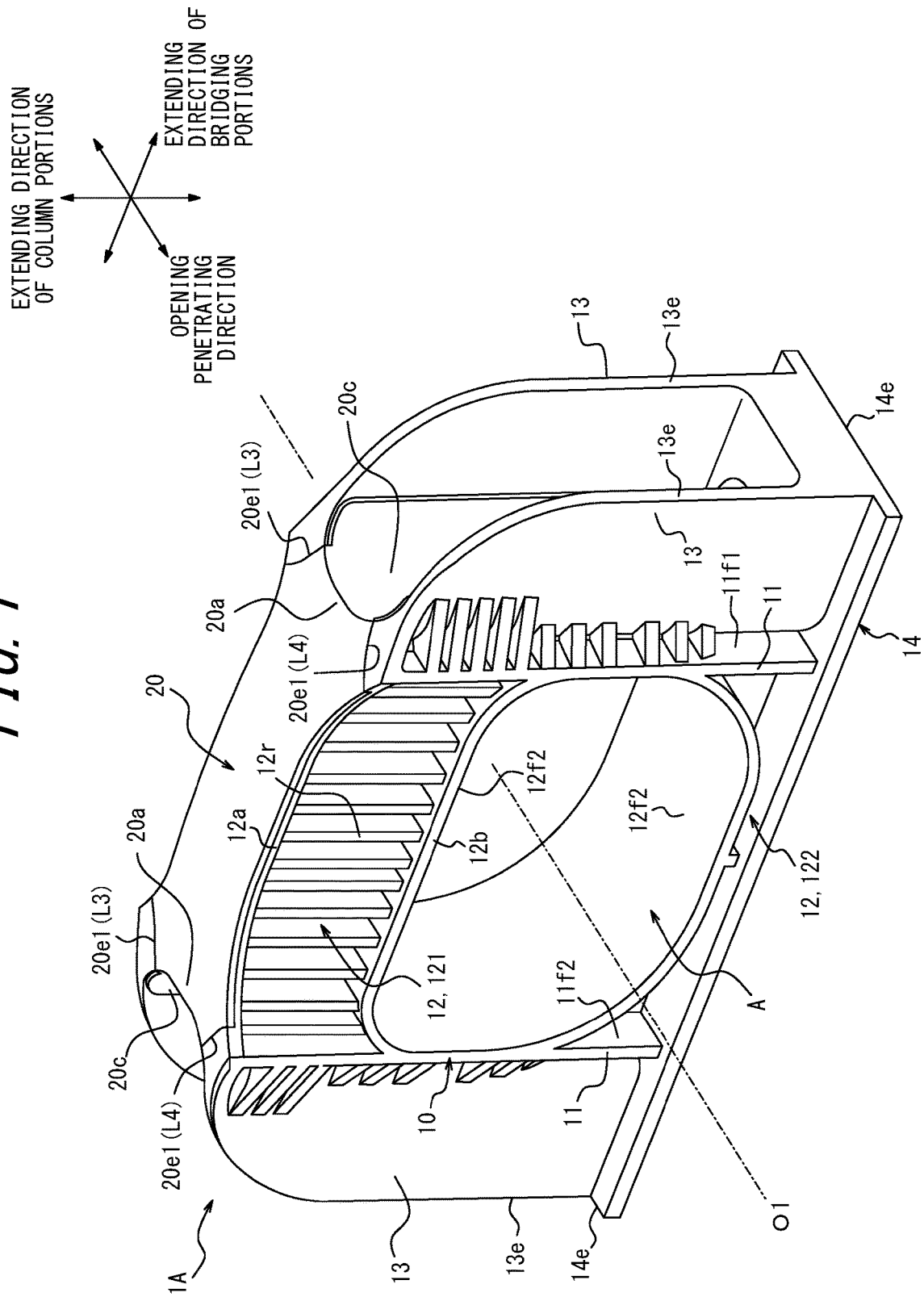
FIG. 1 is a perspective view schematically illustrating a bracket according to a first embodiment of the present disclosure.

FIG. 1 is a perspective view schematically illustrating a bracket 1A according to a first embodiment of the present disclosure.

The bracket 1A has an opening A for attaching an anti-vibration member coupled on one of a vibration generating side and a vibration receiving side and is able to be coupled on the other one of the vibration generating side and the vibration receiving side.

The bracket 1A according to the present embodiment is an engine mount bracket. Examples of the vibration generating side and the vibration receiving side are an engine and a vehicle body. Specifically, one of the vibration generating side and the vibration receiving side can be the engine. Also, examples of the anti-vibration member include an anti-vibration device that couples an inner cylinder to an outer cylinder with an elastic body (rubber, for example), and the inner cylinder is connected to the engine. In FIG. 1, the anti-vibration member is omitted. On the other hand, the other one of the vibration generating side and the vibration receiving side can be the vehicle body. In this case, the bracket 1A can be fixed to the vehicle body as will be described later.

The bracket 1A is made of a resin. The bracket 1A can be integrally formed through injection molding, for example.

The bracket 1A according to the present embodiment includes a bracket main body 10 made of a resin and a reinforcing portion 20. In the present embodiment, the bracket main body 10 can be integrally formed through injection molding, for example, with the reinforcing portion 20 as an insert article. Examples of the resin include a thermoplastic synthetic resin and a thermosetting synthetic resin. The thermoplastic synthetic resin is suitably used as the synthetic resin. Examples of such a thermoplastic synthetic resin include 6-6 nylon, 6 nylon, and polypropylene.

Figure 2:
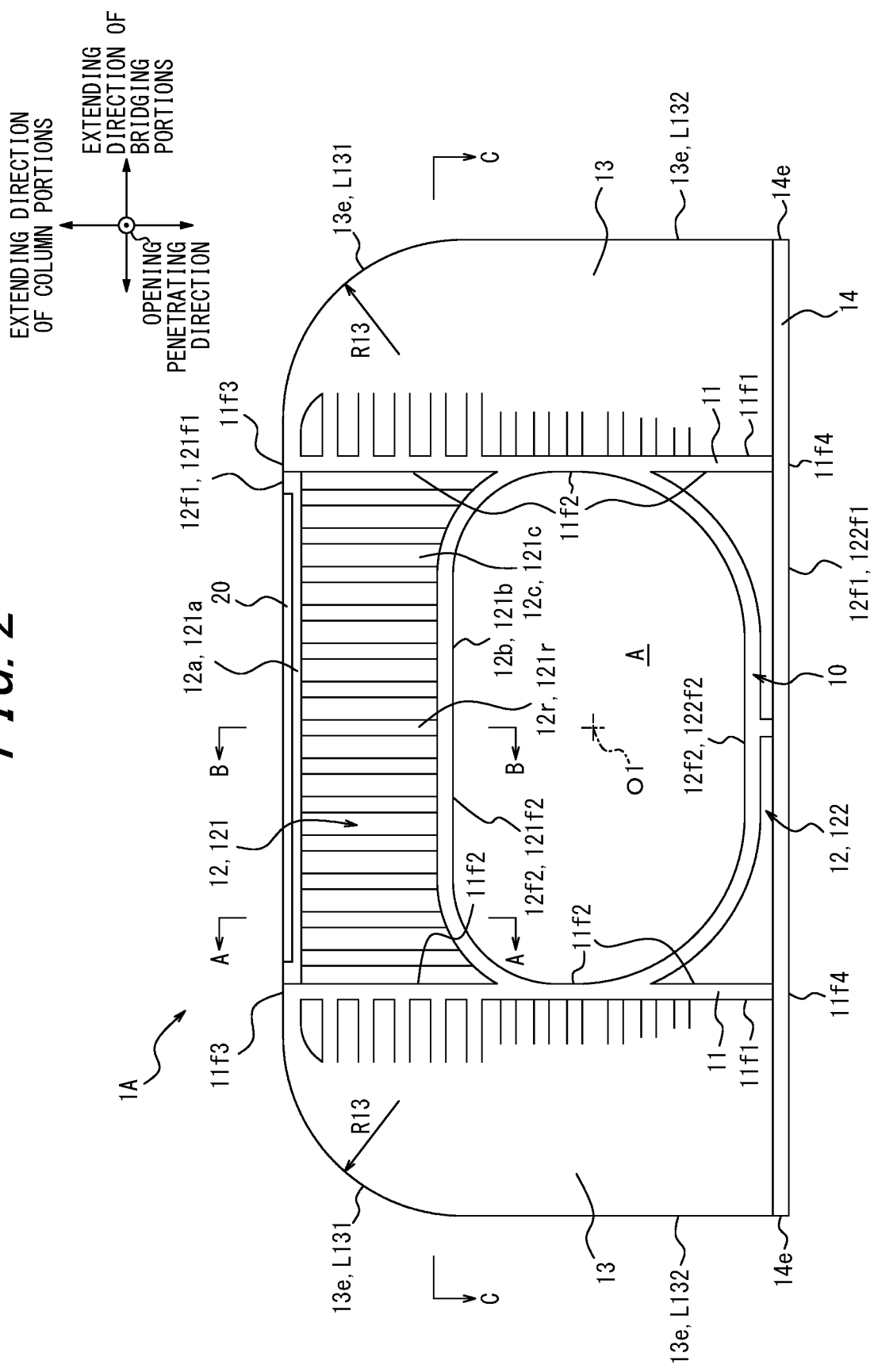
FIG. 2 is a front view of FIG. 1.

The bracket 1A is a tubular bracket. As illustrated in FIG. 2, the bracket 1A has a pair of column portions 11 arranged with an interval therebetween and a pair of bridging portions 12 arranged between the two column portions 11 and coupling the two column portions 11. In this manner, the opening A is defined by the pair of column portions 11 and the pair of bridging portions 12.

In the bracket 1A according to the present embodiment, the bracket main body 10 has the two column portions 11 and the two bridging portions 12.

In the bracket 1A according to the present embodiment, the two column portions 11 are formed as plate portions extending in parallel to each other. In the present embodiment, when the bracket 1A is fixed to the vehicle body, for example, the column portions 11 extend in the up-down direction and form side portions of the bracket main body 10 (bracket 1A). In this case, bracket outer circumferential side outer side surfaces 11/1 of the column portions 11 form parts of an outer circumferential surface of the bracket main body 10. Specifically, the bracket outer circumferential side outer side surfaces 11/1 of the column portions 11 form an outer circumferential side surface of the bracket main body 10.

Also, in the bracket 1A according to the present embodiment, bracket outer circumferential side outer surfaces 12/1 of the bridging portions 12 also form parts of the outer circumferential surface of the bracket main body 10. In the present embodiment, the bracket main body 10 has a first bridging portion 121 and a second bridging portion 122 as the two bridging portions 12. In the present embodiment, when the bracket 1A is fixed to the vehicle body, for example, the first bridging portion 121 is located on the upper side and forms a part of an upper portion of the bracket main body 10 (bracket 1A). Also, in this case, the second bridging portion 122 is located on the lower side and forms a part of a lower portion of the bracket main body 10 (bracket 1A). In more detail, a bracket outer circumferential side outer surface 121/1 of the first bridging portion 121 forms an outer circumferential upper surface of the bracket main body 10 along with a bracket outer circumferential side outer upper surface 11/3 of the column portion 11 as illustrated in FIG. 2. Moreover, a bracket outer circumferential side outer surface 122/1 of the second bridging portion 122 forms an outer circumferential lower surface of the bracket main body 10 along with a bracket outer circumferential side outer lower surface 11/4 of the column portion 11.

In addition, the bracket 1A includes, on the bracket outer circumferential side outer side surface 11/1 of at least one column portion 11 (both column portions 11 in the present embodiment) of the pair of column portions 11, a plate portion 13 that extends all over the column portion 11 in the extending direction of the column portion 11 and projects in the extending direction of the bridging portions 12 beyond the column portion 11.

In the bracket 1A according to the present embodiment, the extending direction of the column portions 11 when the bracket 1A is fixed to the vehicle body, for example, is the up-down direction. Also, in the present embodiment, the extending direction of the bridging portions 12 when the bracket 1A is fixed to the vehicle body, for example, is the horizontal direction. Specifically, the extending direction of the bridging portions 12 is at least any one direction of a vehicle front-back direction and a vehicle left-side direction (vehicle width direction). In the present embodiment, the extending direction of the bridging portions 12 is the vehicle front-back direction. In the present embodiment, the plate portions 13 form parts of the bracket main body 10 by projecting from the column portions 11. In the present embodiment, the bracket main body 10 has two plate portions 13 as the plate portions 13.

Figure 3:
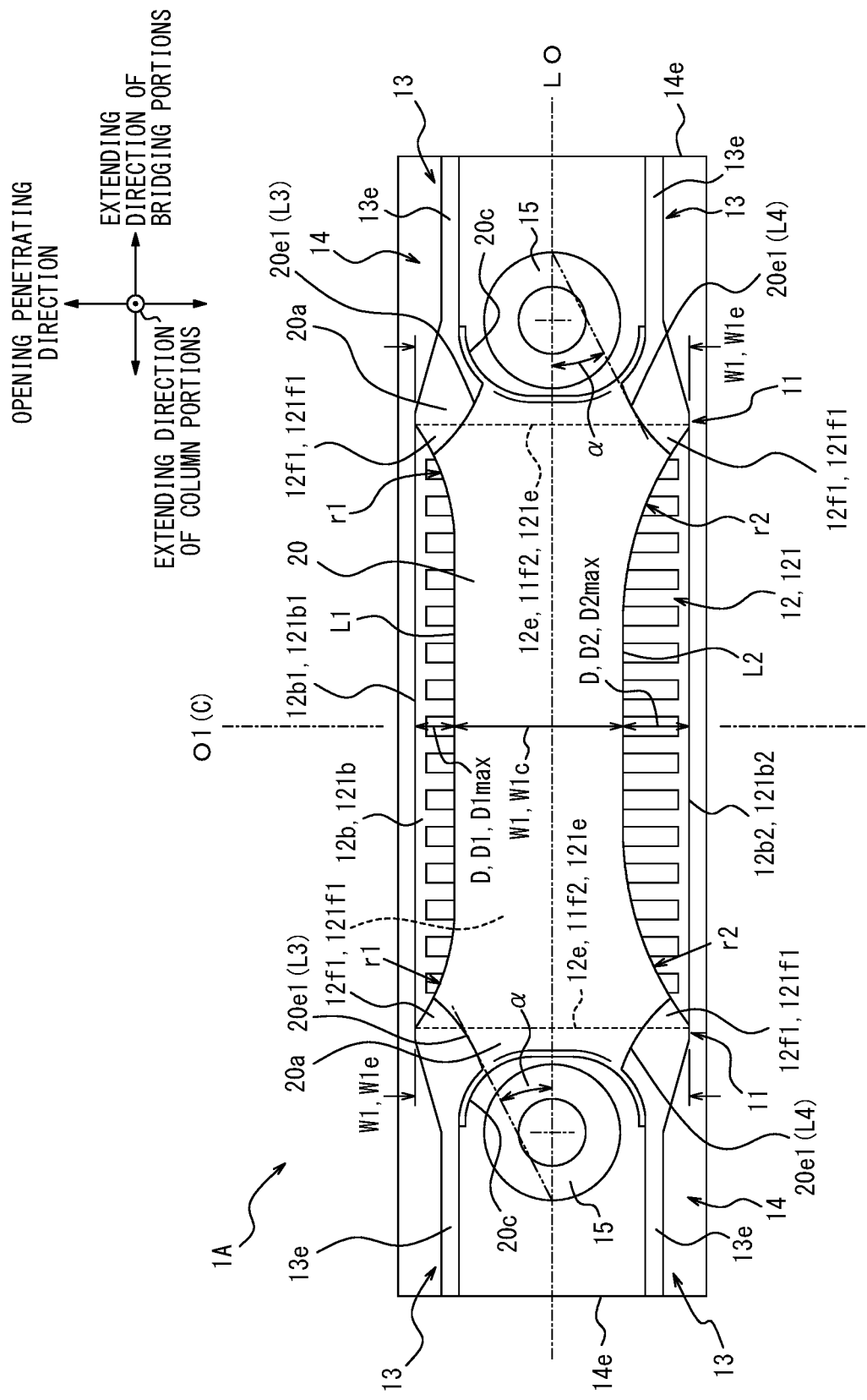
FIG. 3 is a plan view of FIG. 1.

Further, as illustrated in FIG. 3, in one bridging portion 12 of the pair of bridging portions 12 in the bracket 1A, a width W1 of the bracket outer circumferential side outer surface 12f1 of the one bridging portion 12 in an opening penetrating direction is maximum at an extending direction end 12e of the bridging portion 12 on the side of the one column portion 11 in a view in the extending direction of the column portions 11.

In the bracket 1A according to the present embodiment, the opening penetrating direction is a direction in which the opening A penetrates. In the present embodiment, a center axis O1 of the opening A is parallel to the opening penetrating direction. Also, in the present embodiment, the extending direction end 12e of the bridging portion 12 conforms to a bracket inner circumferential side inner side surface 11f2 of the column portion 11 in the extending direction of the bridging portions 12. In the one bridging portion 12 in the present embodiment, the width W1 of the bracket outer circumferential side outer surface 121f1 of the first bridging portion 121 in the opening penetrating direction is maximum at an extending direction end 121e of the first bridging portion 121 on the side of the one column portion 11 such that an area of the bracket outer circumferential side outer surface 121f1 decreases between the extending direction ends 121e in the extending direction of the bridging portions 12. In other words, the width W1 of the bracket outer circumferential side outer surface 121f1 of the first bridging portion 121 in the opening penetrating direction decreases between the extending direction ends 121e in the extending direction of the bridging portions 12 in the present embodiment.

In more detail, an outline of the bracket circumferential side outer surfaces 12f1 of the bridging portions 12 in a side of the opening penetrating direction is formed by a pair of opening penetrating direction side contour lines L1 and L2 in the view in the extending direction of the column portions 11 in the bracket 1A according to the present embodiment as illustrated in FIG. 3. In the present embodiment, the width W1 of the bracket outer circumferential side outer surface 121f1 of the first bridging portion 121 in the opening penetrating direction is a width in the opening penetrating direction between the first opening penetrating direction side contour line (hereinafter, referred to as a "first opening penetrating direction side contour line") L1 and the second opening penetrating direction side contour line (hereinafter, referred to as a "second opening penetrating direction side contour line") L2. As illustrated in FIG. 3, in regard to the width W1 of the bracket outer circumferential side outer surface 121f1 of the first bridging portion 121 in the opening penetrating direction, an opening penetrating direction width W1c at the center of the first bridging portion 121 in the extending direction of the bracket outer circumferential side outer surface 121f1 is minimum, and an opening penetrating direction width W1e at the extending direction end 121e of the first bridging portion 121 is maximum in the present embodiment.

Figure 4A:
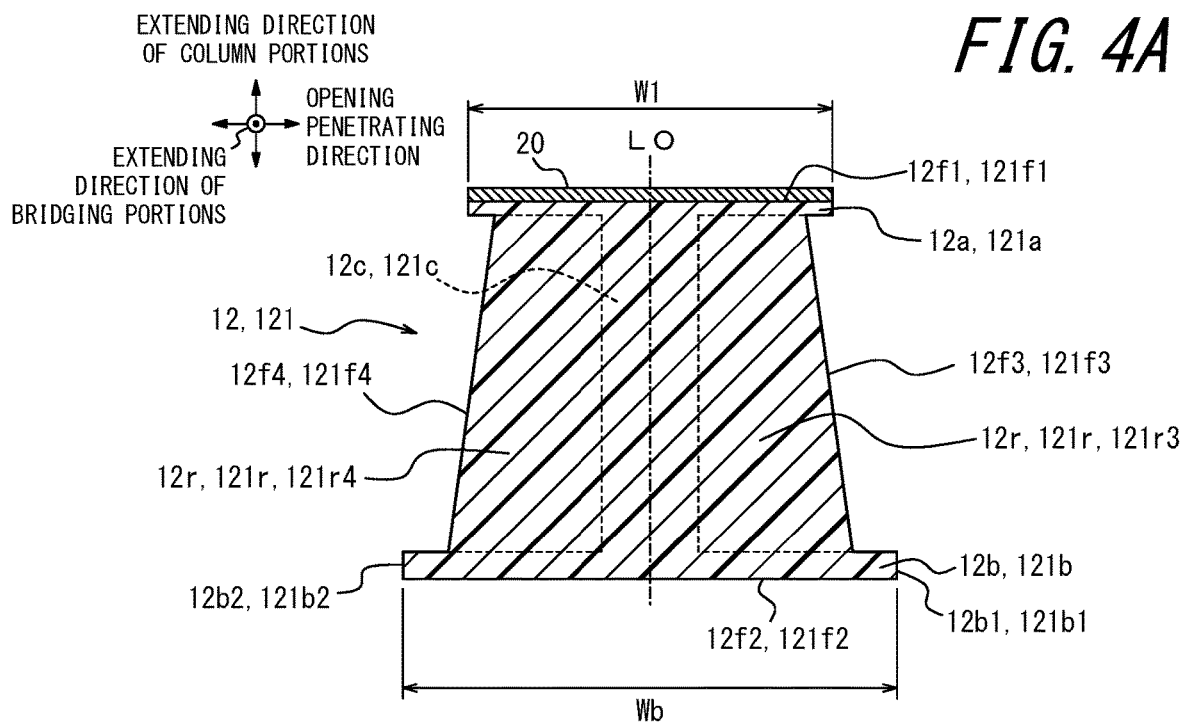
FIG. 4A is a sectional view along A-A in FIG. 2.
Figure 4B:
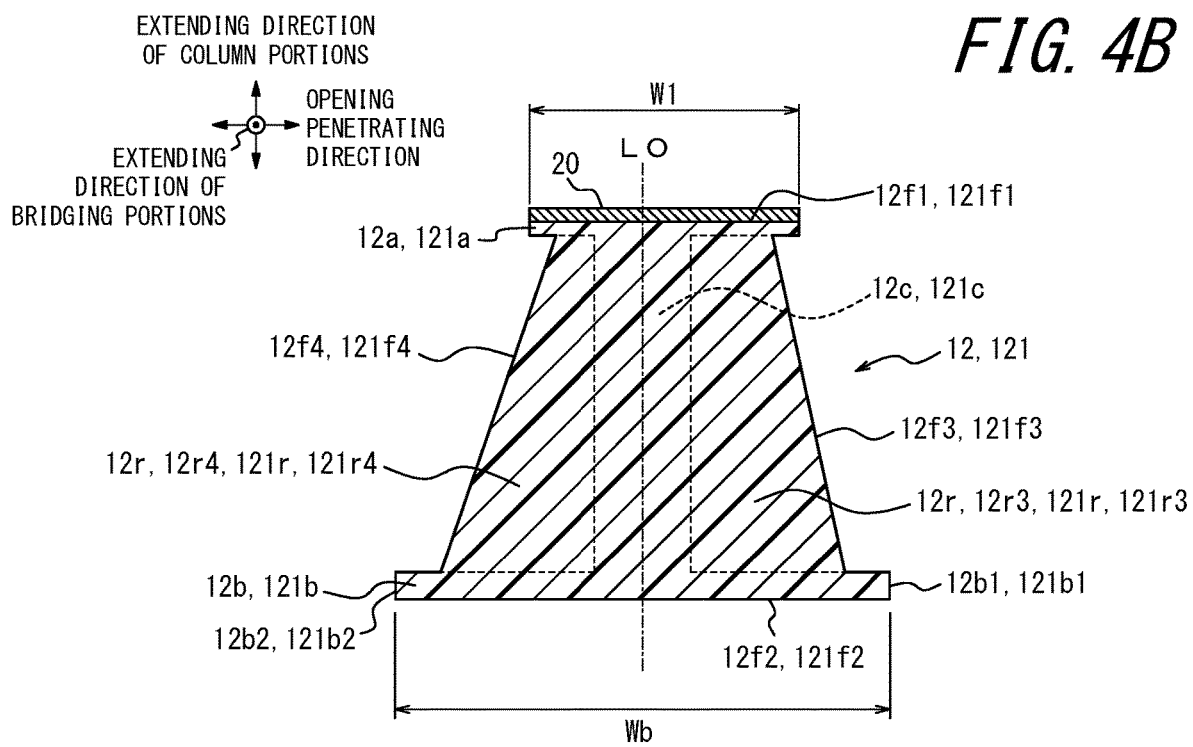
FIG. 4B is a sectional view along B-B in FIG. 2.
Figure 5:
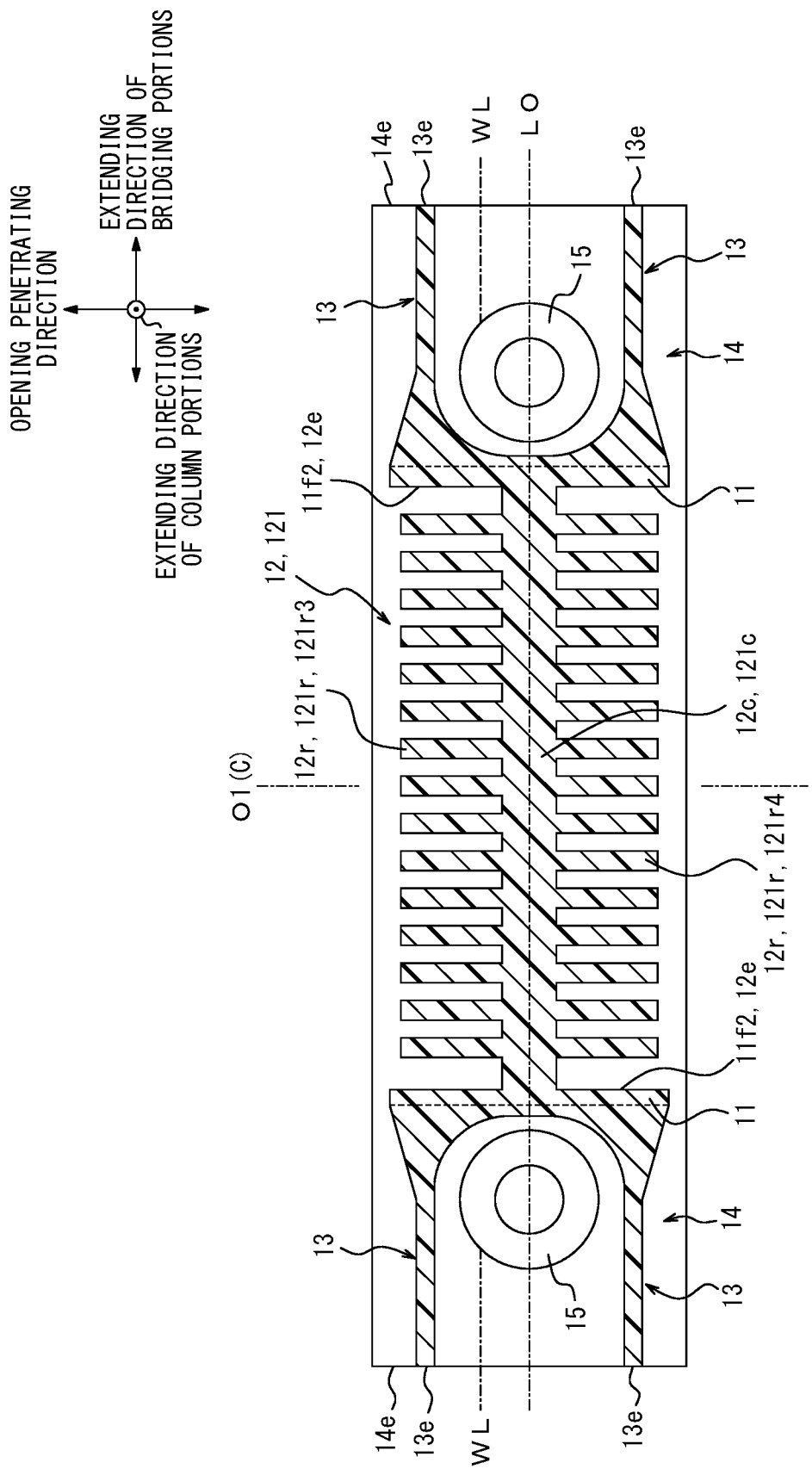
FIG. 5 is a sectional view along C-C in FIG. 2.

Here, FIG. 4A is a sectional view along A-A in FIG. 2. Also, FIG. 4B is a sectional view along B-B in FIG. 2. Moreover, FIG. 5 is a sectional view along C-C in FIG. 2. In one bridging portion 12 in the bracket 1A according to the present embodiment, a width Wb of a bracket inner circumferential side inner surface 12f2 of the one bridging portion 12 in the opening penetrating direction is longer than the width W1 of the bracket outer circumferential side outer surface 12f1 of the one bridging portion 12 in the opening penetrating direction as illustrated in FIGS. 4A and 4B. Also, in the present embodiment, each of an opening penetrating direction one end side outer surface 12f3 and an opening penetrating direction other end side outer surface 12f4 of the one bridging portion 12 is an inclined surface that is inclined toward the center in the opening penetrating direction toward the bracket outer circumferential side (the vehicle upper side after attachment to the vehicle in the present embodiment) in the extending direction of the column portions 11 in a view in the extending direction of the bridging portions 12 as illustrated in FIGS. 4A and 4B.

In the bracket 1A according to the present embodiment, one bridging portion 12 has a bracket outer circumferential side part 12a, a bracket inner circumferential side part 12b, and a separating part 12c and ribs 12r that couple the bracket outer circumferential side part 12a to the bracket inner circumferential side part 12b as illustrated in FIG. 2. The bracket outer circumferential side part 12a and the bracket inner circumferential side part 12b are arranged with an interval in the extending direction of the column portions 11. The bracket outer circumferential side part 12a and the bracket inner circumferential side part 12b extend in the extending direction of the bridging portion 12. The separating part 12c is coupled to the bracket inner circumferential side inner side surfaces 11f2 of the column portions 11 along with the bracket outer circumferential side part 12a and the bracket inner circumferential side part 12b. Also, in the present embodiment, a plurality of ribs 12r arranged at intervals in the extending direction of the bridging portion 12 are included as the ribs 12r. Each of the ribs 12r is coupled to the separating part 12c along with the bracket outer circumferential side part 12a and the bracket inner circumferential side part 12b. As illustrated in FIGS. 4A and 4B, one bridging portion 12 has, as the ribs 12r, a plurality of opening penetrating direction one end side ribs 12r3 and a plurality of opening penetrating direction other end side ribs 12r4 with the separating part 12c interposed therebetween. The opening penetrating direction one end side outer surface 12f3 of the first bridging portion 12 is formed with an inclined surface. Also, in the present embodiment, the opening penetrating direction other end side outer surface 12f4 of the bridging portion 12 is also formed with an inclined surface.

In more detail, in the bracket 1A according to the present embodiment, the first bridging portion 121 has a bracket outer circumferential side part 121a, a bracket inner circumferential side part 121b, and a separating part 121c and ribs 121r that couple the bracket outer circumferential side part 121a and the bracket inner circumferential side part 121b as illustrated in FIG. 2. As illustrated in FIGS. 4A and 4B, the first bridging portion 121 has, as the ribs 121r, a plurality of opening penetrating direction one end side ribs 121r3 and a plurality of opening penetrating direction other end side ribs 121r4 with the separating part 121c interposed therebetween in the present embodiment. As illustrated in FIGS. 4A and 4B, an opening penetrating direction one end side outer surface 121f3 of the first bridging portion 121 is formed with inclined surfaces of the opening penetrating direction one end side ribs 121r3 in the present embodiment. Moreover, an opening penetrating direction other end side outer surface 121f4 of the first bridging portion 121 is formed with inclined surfaces of the opening penetrating direction other end side ribs 121r4 in the present embodiment.

As described above, in the bracket 1A, the bracket outer circumferential side outer side surface 11f1 of at least one column portion 11 can be provided with the plate portion 13, the plate portion 13 can be caused to extend in over the extending direction of the column portion 11 and project in the extending direction of the bridging portion 12 beyond the column portion 11 as illustrated in FIG. 2, for example. In this case, it is possible to enhance strength of the bracket as compared with a bracket with no plate portion 13. According to the bracket 1A of the present embodiment, in particular, it is possible to further enhance the strength of the bracket 1A by providing the plate portion 13 in each of the bracket outer circumferential side outer side surfaces 11f1 of the two column portions 11.

In addition, in one bridging portion 12 of the pair of bridging portions 12 in the bracket 1A, the width W1 of the bracket outer circumferential side outer surface 12f1 of the one bridging portion 12 in the opening penetrating direction is maximum at the extending direction end 12e of the bridging portion 12 in a view in the extending direction of the column portions 11 as illustrated in FIG. 3. In this case, since the width W1 of the bracket outer circumferential side outer surface 12f1 of the one bridging portion 12 in the opening penetrating direction is the maximum value W1e, it is possible to secure strength at connecting portions between the column portions 11 and the bridging portions 12 on which a stress is likely to concentrate when a load is input to the bracket 1A. Also, in this case, it is possible to reduce the weight of the bracket 1A by the amount corresponding to a decrease in width W1 in the opening penetrating direction over the extending direction end 12e of the corresponding bracket outer circumferential side outer surface 12f1 of the bracket outer circumferential side outer surfaces 12f1 of the bridging portions 12. In the present embodiment, the one bridging portion 12 is the first bridging portion 12 arranged on the upper side when the bracket 1A is fixed to the vehicle body.

In this manner, according to the bracket 1A of the present embodiment, a bracket that has excellent durability while curbing an increase in weight is achieved.

In particular, as illustrated in FIGS. 4A and 4B, a width Wb of the bracket inner circumferential side inner surface 12f2 of the bridging portion 12 in the opening penetrating direction is longer than the width W1 of the bracket outer circumferential side outer surface 12f1 of the bridging portion 12 in the opening penetrating direction in the bracket 1A according to the embodiment. It is thus possible to secure a large bonding force to the elastic body that couples the anti-vibration member to the bracket 1A. Also, in the present embodiment, an increase in gravity of the bridging portion 12 is curbed by the opening penetrating direction one end side outer surface 12f3 and the opening penetrating direction other end side outer surface 12f4 of the bridging portion 12 forming inclined surfaces. Therefore, it is possible to secure higher strength of the bridging portion 12 as compared with a case in which the volume of the bridging portion 12 is reduced from the bracket outer circumferential side outer surface 12f1 to the bracket inner circumferential side inner surface 12f2 of the bridging portion 12 in accordance with the bracket outer circumferential side outer surface 12f1 of the bridging portion 12.

Also, in the bracket 1A, the width W1 of the bracket outer circumferential side outer surface 12f of the one bridging portion 12 in the opening penetrating direction becomes narrower from the extending direction end 12e of the bridging portion 12 toward the center C of the bridging portion 12 in the extending direction of the bridging portion 12 in the view in the extending direction of the column portions 11 as illustrated in FIG. 3.

As illustrated in FIG. 3, the center C of the bridging portion 12 in the extending direction of the bridging portion 12 is a position at which the length of the bridging portion 12 in the extending direction of the bridging portion 12 is equally divided into two in the view in the extending direction of the column portions 11 in the bracket 1A according to the present embodiment. As illustrated in FIG. 3, the center C of the bridging portion 12 in the extending direction of the bridging portion 12 conforms to the center axis O1 of the opening A in the view in the extending direction of the column portions 11 in the present embodiment. Also, in the present embodiment, the width W1 of the bracket outer circumferential side outer surface 121f1 of the first bridging portion 121 in the opening penetrating direction becomes narrower from the extending direction end 121e of the first bridging portion 121 toward the center C of the first bridging portion 121 in the extending direction of the first bridging portion 121 in the view in the extending direction of the column portions 11.

In this case, it is possible to secure strength of the connecting portions between the column portions 11 and the bridging portions 12 on which a stress is likely to concentrate when a load is input to the bracket 1A and to curb an increase in weight by narrowing the center C of the bracket outer circumferential side outer surface of the first bridging portion 121 in the extending direction of the first bridging portion 121.

Also, in the bracket 1A, the opening penetrating direction side contour line L1 or L2 that is one of the pair of opening penetrating direction side contour lines L1 and L2 forming the outline of the bracket outer circumferential side outer surface 12f1 of the one bridging portion 12 in the side of the opening penetrating direction is preferably a curve having a depression going toward the opening penetrating direction side contour line L2 or L1 that is the other one of the two opening penetrating direction side contour lines L1 and L2 from the extending direction end 12e of the bridging portion 12 toward the center C of the bridging portion 12 in the extending direction of the bridging portion 12 in the view in the extending direction of the column portions 11.

As illustrated in FIG. 3, in the bracket 1A according to the present embodiment, the first opening penetrating direction side contour line L1 of the pair of opening penetrating direction side contour lines L1 and L2 forming the outline of the bracket outer circumferential side outer surface 121f1 of the first bridging portion 121 in the side of the opening penetrating direction is a curve having a depression going toward the second opening penetrating direction side contour line L2 from the extending direction end 121e of the bridging portion 121 toward the center C of the bridging portion 121 in the extending direction of the bridging portion 12 in the view in the extending direction of the column portions 11. In the present embodiment, the first opening penetrating direction side contour line L1 is formed with two curves extending in the extending direction of the bridging portion 12 from the extending direction end 121e of the first bridging portion 121 on the side of the first opening penetrating direction side contour line L1 and a straight line connecting the two curves. In the present embodiment, each of the two curves is a curve formed with a radius of curvature r1. Also, in the present embodiment, the straight line is a straight line extending in the extending direction of the bridging portion 12 and extends to a location near the center C of the bridging portion 12 in the extending direction of the bridging portion 12.

In this case, since the first opening penetrating direction side contour line L1 of the bracket outer circumferential side outer surface 121f1 of the first bridging portion 121 is a curve having a depression, it is possible to curb an increase in weight while curbing stress concentration that may be caused on the first opening penetrating direction side contour line L1 where there are many weld lines, that is strength degraded sites, formed at portions where resin flows separate from and meet each other during injection molding, by smoothly reducing the width W1 in the opening penetrating direction.

Also, in the bracket 1A, the other one of the pair of opening penetrating direction side contour lines L1 and L2 of the bracket outer circumferential side outer surface 12f1 of the one bridging portion 12 is preferably a curve having a depression going toward the one of the opening penetrating direction side contour lines L1 or L2 from the extending direction end 12e of the bridging portion 12 toward the center C of the bridging portion 12 in the extending direction of the bridging portion 12 in the view in the extending direction of the column portions 11.

As illustrated in FIG. 3, in the bracket 1A according to the present embodiment, the second opening penetrating direction side contour line L2 of the bracket outer circumferential side outer surface 121f1 of the first bridging portion 121 is a curve having a depression going toward the first opening penetrating direction side contour line L1 from the extending direction end 121e of the first bridging portion 121 toward the center C of the bridging portion 121 in the extending direction of the bridging portion 12 in the view in the extending direction of the column portions 11. In the present embodiment, the second opening penetrating direction side contour line L2 is formed with two curves extending in the extending direction of the bridging portion 12 from the extending direction end 121e of the first bridging portion 121 on the side of the second opening penetrating direction side contour line L2 and a straight line connecting the two curves. In the present embodiment, each of the two curves is a curve formed with a radius of curvature r2. Moreover, in the present embodiment, the straight line is a straight line extending in the extending direction of the bridging portion 12 and extends to a location near the center C of the bridging portion 12 in the extending direction of the bridging portion 12.

In this case, since the second opening penetrating direction side contour line L2 of the bracket outer circumferential side outer surface 121f1 of the first bridging portion 121 is a curve having a depression, it is possible to curb an increase in weight while curbing stress concentration that may be caused on the second opening penetrating direction side contour line L2, by smoothly reducing the width W1 in the opening penetrating direction.

Further, in the bracket 1A, a depth D of the depression of the first opening penetrating direction side contour line L1 in the opening penetrating direction of the bracket outer circumferential side outer surface 12f1 of the one bridging portion 12 is preferably different from a depth D of the depression of the second opening penetrating direction side contour line L2 in the opening penetrating direction in the view in the extending direction of the column portions 11.

If an excessively large load is applied to the bracket in a case in which the bracket is injection-molded, a weld line WL of the bracket may become a starting point of separating the bracket along the weld line WL. Therefore, the weld line WL of the bracket is preferably formed to avoid a position to which a large load is applied during utilization of the bracket. However, in a case in which an injection gate position is limited in terms of a design and a structure, the position of the weld line WL is uniquely determined. In this case, it is difficult to control the weld line WL to avoid stress concentration since a change in the injection gate position is limited.

On the other hand, when the weld line WL of the bracket 1A is a weld line WL extending in the extending direction of the bridging portions 12 in the view in the extending direction of the column portions 11 as illustrated in FIG. 5 in the bracket 1A according to the present embodiment, the weld line WL can be formed at a position near the opening penetrating direction side contour line L1 or L2 on a side on which the depth D in the opening penetrating direction is shallow if the depth D of one of the opening penetrating direction side contour lines L1 and L2 in the opening penetrating direction is caused to be different from the depth D of the other one of the opening penetrating direction side contour lines L1 and L2 in the opening penetrating direction in the view in the extending direction of the column portion 11 as illustrated in FIG. 3. In other words, it is possible to control the position of the weld line WL by adjusting the two depths D in the opening penetrating direction.

Therefore, as illustrated in FIG. 3, it is possible to cause the weld line WL to avoid the position of the bracket 1A on which a large load is applied by causing the depth D of one of the opening penetrating direction side contour lines L1 and L2 in the opening penetrating direction to be different from the depth D of the other one of the opening penetrating direction side contour lines L1 and L2 in the opening penetrating direction in the view in the extending direction of the column portions 11 to appropriately adjust the depths D in the opening penetrating direction in the bracket 1A according to the present embodiment.

As illustrated in FIG. 3, the depth D of the one opening penetrating direction side contour line L1 of the bracket outer circumferential side outer surface 12f1 of the one bridging portion 12 in the opening penetrating direction is shallower than the depth D of the other opening penetrating direction side contour line L2 in the opening penetrating direction in the view in the extending direction of the column portions 11 in the bracket 1A according to the present embodiment. In the present embodiment, a depth D1 of the first opening penetrating direction side contour line L1 in the opening penetrating direction of the bracket outer circumferential side outer surface 121f of the first bridging portion 121 is shallower than the depth D2 of the second opening penetrating direction side contour line L2 in the opening penetrating direction.

In the bracket 1A according to the present embodiment, the depth D1 of the first opening penetrating direction side contour line L1 in the opening penetrating direction is the depth D1 in the opening penetrating direction between an opening extending direction one side end 12b1 of a bracket inner circumferential side part 12b of the one bridging portion 12 and the opening penetrating direction side contour line L1 of the one bridging portion 12 in the view in the extending direction of the column portions 11 as illustrated in FIG. 3. Also, in the present embodiment, the depth D2 of the second opening penetrating direction side contour line L2 in the opening penetrating direction is a depth in the opening penetrating direction between an opening extending direction other side end 12b2 of the bracket inner circumferential side part 12b of the one bridging portion 121 and the opening penetrating direction side contour line L2 of the one bridging portion 12 in the view in the extending direction of the column portions 11 as illustrated in FIG. 3.

Further, in the bracket 1A according to the present embodiment, the depth D1 of the first opening penetrating direction side contour line L1 in the opening penetrating direction is the deepest at the center C of the bridging portion 12 in the extending direction of the bridging portion 12 in the view in the extending direction of the column portions 11 as illustrated in FIG. 3. In the present embodiment, the maximum value of the first opening penetrating direction depth D1 satisfies D1=D1max in the view in the extending direction of the column portions 11 as illustrated in FIG. 3. Also, in the present embodiment, the depth D2 of the second opening penetrating direction side contour line L2 in the opening penetrating direction is also the deepest at the center C of the bridging portion 12 in the extending direction of the bridging portion 12 in the view in the extending direction of the column portions 11 as illustrated in FIG. 3. In the present embodiment, the maximum value of the second opening penetrating direction depth D2 satisfies D2=D2max in the view in the extending direction of the column portions 11 as illustrated in FIG. 3. In the present embodiment, the maximum value D1max of the depth D1 in the opening penetrating direction and the maximum value D2max of the depth D2 in the opening penetrating direction are different from each other.

In the bracket 1A according to the present embodiment, the maximum value D1max of the depth D1 in the opening penetrating direction is shallower than the maximum value D2max of the depth D2 in the opening penetrating direction. In this case, the weld line WL tends to be formed on the side on which the depth D in the opening penetrating direction is shallow in the present embodiment as illustrated in FIG. 5. On the other hand, in such a bracket, an external force applied to the bridging portions typically acts on a center line LO in the bracket width direction along the center line LO in the bracket width direction in a view in the extending direction of the column portions at the bridging portions of the bracket as illustrated in FIG. 5. The center line LO in the bracket width direction is a straight line that is parallel to the extending direction of the bridging portions 12 and is a straight line passing through the center of the width of the bridging portions 12 (the bracket main body 10 (bracket 1A) in the present embodiment) in the opening penetrating direction. On the other hand, according to the present embodiment, the weld line WL is formed on the side of the first opening penetrating direction side contour line L1 on which the depth D in the opening penetrating direction is shallow as illustrated in FIG. 5. In this case, even if stress concentration due to a load applied along the center line LO in the bracket width direction is caused, for example, by an input of the load on the bracket 1A, stress concentration that may be caused along the weld line WL is curbed since the weld line WL deviates in the opening penetrating direction from the center line LO in the bracket width direction. Therefore, according to the bracket 1A of the present embodiment, a bracket that has more excellent durability is achieved.

In addition, in the bracket 1A, the other bridging portion 12 of the pair of bridging portions 12 preferably further includes, on an extension of the other bridging portion 12 in the extending direction of the other bridging portion 12, flange portions 14 projecting from the bracket outer circumferential side outer side surfaces 11/1 of the column portions 11, and the flange portions 14 and the plate portions 13 are preferably coupled to each other.

As illustrated in FIG. 2 and the like, in the bracket 1A according to the present embodiment, the second bridging portion 122 that serves as the other bridging portion 12 further includes, on the extension of the second bridging portion 122 in the extending direction of the other bridging portion 12, the flange portion 14 projecting from the bracket outer circumferential side outer side surface 11/1 of the column portion 11. In the present embodiment, the plate portions 13 are coupled to the flange portion 14. In the present embodiment, the plate portions 13 form parts of the bracket main body 10 by being coupled to the flange portion 14 along with the column portion 11. In this case, a bracket with more excellent durability is achieved. In the present embodiment, the bracket main body 10 has two flange portions 14, each of which serves as the flange portion 14. In this case, a bracket with more excellent durability is achieved.

In the bracket 1A according to the present embodiment, the flange portions 14 have fixing portions 15 for fixing the bracket 1A to the vehicle body as illustrated in FIG. 3 and the like. In the present embodiment, the fixing portions 15 are seat portions that have openings that cause fastening elements such as bolts to penetrate therethrough. In the present embodiment, a bracket outer circumferential side side edges 13e of the plate portions 13 extend in the extending direction of the bridging portions 12 so as to cover and hide the fixing portions 15 of the flange portions 14 in the opening penetrating direction in the view in the extending direction of the column portions 11 as illustrated in FIG. 3. In the present embodiment, the bracket outer circumferential side side edges 13e of the plate portions 13 extend up to positions exceeding the fixing portions 15 in the extending direction of the bridging portions 12 in the view in the extending direction of the column portions 11. Particularly, in the present embodiment, the bracket outer circumferential side side edges 13e of the plate portions 13 extend to positions that conform to bracket outer circumferential side side edges 14e of the flange portions 14 as illustrated in FIG. 5. Moreover, in the present embodiment, the plate portions 13 are formed with a first contour line L131 and a second contour line L132 to which the first contour line L131 is connected in a view in the opening penetrating direction as illustrated in FIG. 2. In the present embodiment, the first contour line L131 is a curve that is connected to the one bridging portion 12 (first bridging portion 121) with a radius of curvature R13. The second contour line L132 is a straight line extending in the extending direction of the column portions 11 (vehicle up-down direction).

Also, the bracket 1A preferably includes a reinforcing portion 20 on the bracket outer circumferential side outer surface 12/1 of the one bridging portion 12.

The bracket 1A according to the present embodiment includes the reinforcing portion 20 on the bracket outer circumferential side outer surface 121/1 of the first bridging portion 121 as illustrated in FIG. 2. In the present embodiment, the reinforcing portion 20 is a compound material with strength enhanced by containing a synthetic resin in a fibrous element, that is, a so-called fiber reinforced plastic (FRP). Examples of the fiber reinforced plastic include prepreg. Examples of the fibrous element include a glass fiber fabric, a carbon fiber fabric, a metal fiber fabric, an organic fabric, and a fiber fabric with higher bending strength than the bracket main body 10, and the like. The glass fiber fabric is suitably used as the fibrous element. Also, examples of the fiber reinforced plastic include a uni-direction (UD) material containing a synthetic resin in a fibrous element with directionality. Examples of the fibrous element include a glass fiber, a carbon fiber, a metal fiber, an organic fiber, a fiber with higher bending strength than the bracket main body 10, fabrics thereof, and the like. In the present embodiment, the bracket 1A can be integrally formed through injection molding with the reinforcing portion 20 as an insert article, for example.

In the bracket 1A according to the present embodiment, the bridging portion 12 is a portion where a load of receiving the reinforcing portion 20 on the outer circumferential side of the bracket 1A is a minimum necessary load when a load is input to the bracket 1A. Therefore, if the bracket outer circumferential side outer surface 12/1 of the bridging portion 12 is provided with the reinforcing portion 20 as in the present embodiment, it is possible to reinforce the bracket 1A (bracket main body 10) with the reinforcing portion 20 without providing the plate portions 13 at a location where the load of receiving the reinforcing portion 20 on the outer circumferential side of the bracket 1A is a minimum necessary load when a load is input to the bracket 1A. In this case, the bracket 1A becomes a bracket with more excellent durability.

Also, as illustrated in FIG. 3, the reinforcing portion 20 preferably has inclined ends 20e1 inclined in a tapered manner in a direction from the one bridging portion 12 toward the plate portions 13 in the view in the extending direction of the column portions 11 in the bracket 1A.

As illustrated in FIG. 3, the bracket 1A according to the present embodiment includes, as the plate portions 13, a plurality of plate portions 13 arranged at an interval in the opening penetrating direction. In the present embodiment, each of the two column portions 11 is provided with two plate portions 13. In the present embodiment, the reinforcing portion 20 has the inclined ends 20e1 inclined in a tapered manner in the direction from the one bridging portion 12 toward the plate portions 13 in the view in the extending direction of the column portions 11 as illustrated in FIG. 3.

In the bracket 1A according to the present embodiment, the inclined ends 20e1 of the reinforcing portion 20 are a pair of opening penetrating direction side contour lines L3 and L4 forming the opening penetrating direction side outline of the reinforcing portion 20 in the view in the extending direction of the column portions 11 as illustrated in FIG. 3. In the present embodiment, the inclined ends 20e1 of the reinforcing portion 20 form tapered parts 20a at the reinforcing portion 20 as parts of the reinforcing portion 20. Each of the two opening penetrating direction side contour lines L3 and L4 is inclined by an angle α with respect to the center line LO in the bracket width direction in the view in the extending direction of the column portions 11 as illustrated in FIG. 3. The angle α is an acute angle inclined toward the center line LO in the bracket width direction from the column portion 11 toward the bridging portion 12 in the view in the extending direction of the column portions 11 as illustrated in FIG. 3. The angle α is preferably 60° or less. More preferably, the angle α is 10° or more and 45° or less. Further preferably, the angle α is 10° or more and 40° or less. The angle α can be appropriately set in accordance with the shape, the material, and the purpose of utilization of the bracket 1A.

As a method for manufacturing the bracket 1A, there is a method of performing injection molding with a fiber member as described above as an insert article. According to the method, it is possible to insert-mold the bracket 1A with the reinforcing portion 20 provided on the outer circumferential surface side of the bracket main body 10.

However, the reinforcing portion 20 such as prepreg typically has higher rigidity than a base material resin forming the bracket main body 10. Therefore, stress concentration may occur on the base material resin near ends of the reinforcing portion 20 (a boundary line between the base material resin forming the bracket main body 10 and the fiber member forming the reinforcing portion 20) when a large load is input to the bracket 1A after the insertion molding, and an efficient reinforcing effect may not be able to be obtained.

On the other hand, in the bracket 1A according to the present embodiment, the extending direction ends of the bridging portions 12 of the reinforcing portion 20 (opening penetrating direction side contour lines L3 and L4) are inclined mainly with respect to a tensile stress generation direction (the extending direction of the bridging portions 12 in the present embodiment) by forming the inclined ends 20e1 inclined in a tapered manner in the direction from the bridging portion 12 toward the plate portions 13 at the reinforcing portion 20 in the view in the extending direction of the column portions 11. In this case, it is possible to cause a location where a stress is generated due to a difference in rigidity between the base material resin (bracket main body 10) and the reinforcing portion 20 to be dispersed by extending direction ends of the bridging portions 12 of the reinforcing portion 20 in the extending direction of the bridging portion 12 (obliquely extending the ends). Note that the inclined ends 20e1 of the reinforcing portion 20 are preferably provided on both sides of the reinforcing portion 20 in the opening penetrating direction in a case in which a plurality of plate portions 13 arranged with an interval in the opening penetrating direction are included as the plate portions 13 as in the present embodiment. However, according to the present disclosure, any one of the two opening penetrating direction side contour lines L3 and L4 may be provided with the inclined end 20e1 of the reinforcing portion 20.

Also, as illustrated in FIG. 1 and the like, the reinforcing portion 20 preferably extends from the tapered parts 20a in the extending direction of the column portions 11 between the plate portions 13 in the bracket 1A.

In the bracket 1A according to the present embodiment, a portion 20c of the reinforcing portion 20 extends in the extending direction of the column portions 11 between the tapered part 20a and the plate portion 13. 20c is an extended portion connected to the tapered part 20a of the reinforcing portion 20. In this case, a bracket with more excellent durability is achieved. Note that in the present embodiment, the reinforcing portion 20 is a belt-shaped member. The reinforcing portion 20 includes the tapered parts 20a and the extended portions 20c.

FIG. 6 is a perspective view schematically illustrating a bracket 1B according to a second embodiment of the present disclosure. Hereinafter, the same reference signs will be applied to portions with substantially the same configurations as those of the bracket 1A, and description thereof will be omitted.

In the bracket 1B, a reinforcing portion 20 has vertical ends 20e2 at which the width W1 in the opening penetrating direction changes in a stepwise manner (to be parallel to the center axis O1 of the opening A in the view in the extending direction of the column portions 11) from one bridging portion 12 toward plate portions 13 in the view in the extending direction of the column portions 11 instead of the inclined ends 20e1. The vertical ends 20e2 of the reinforcing portion 20 are a pair of opening penetrating direction side contour lines L5 forming a part of the outline of the reinforcing portion 20 on the side of the extending direction of the bridging portion 12 as illustrated in FIG. 6. In the present embodiment, the vertical ends 20e2 serve as parts of the reinforcing portion 20 and form step portions 20b at the reinforcing portion 20. Each of the two opening penetrating direction side contour lines L5 is inclined by an angle $\alpha=90°$ with respect to the center line LO in the bracket width direction in the view in the extending direction of the column portions 11. In other words, in the present embodiment, each of the two opening penetrating direction side contour lines L5 extends in parallel with the opening penetrating direction (the center axis O1 of the opening A). Note that the reinforcing portion 20 is a belt-shaped member in the present embodiment as well. The reinforcing portion 20 includes the step portions 20b and the extended portions 20c.

As described above, according to the present disclosure, it is possible to provide the brackets 1A and 1B that have excellent durability while curbing an increase in weight.

The above description is merely description of some embodiments of the present disclosure, and various modifications can be made in accordance with the scope of the claims. For example, although the shape of the opening A in the brackets 1A and 1B is a rectangular shape in a view in the opening penetrating direction, the shape may be an oval shape or a perfect circular shape.

REFERENCE SIGNS LIST

1A Bracket (first embodiment)
1B Bracket (second embodiment)
10 Bracket (second embodiment)
11 Column portion
11f1 Bracket outer circumferential side outer side surface of column portion
11f2 Bracket inner circumferential side inner side surface of column portion
12 Bridging portion
12a Bracket outer circumferential side part
12b Bracket inner circumferential side part
12c Separating part
12r Rib
12e Extending direction end of bracket outer circumferential side outer surface of one bridging portion
121 First bridging portion
122 Second bridging portion
13 Plate portion
14 Flange portion
15 Fixing portion
20 Reinforcing portion
20a Tapered part of reinforcing portion
20e1 Inclined end of reinforcing portion
A Opening
D1 Depth of depression of one opening penetrating direction side contour line in opening penetrating direction
D2 Depth of depression of other opening penetrating direction side contour line in opening penetrating direction
L1 One opening penetrating direction side contour line of pair of opening penetrating direction side contour lines forming outline of bracket outer circumferential side outer surface of one bridging portion in side of opening penetrating direction
L2 Other opening penetrating direction side contour line of pair of opening penetrating direction side contour lines forming outline of bracket outer circumferential side outer surface of one bridging portion in side of opening penetrating direction
W1 Width of bracket outer circumferential side outer surface of one bridging portion in opening penetrating direction
W1c Width of extending direction center of bracket outer circumferential side outer surface of one bridging portion in opening penetrating direction
W1e Width of extending direction end of bracket outer circumferential side outer surface of one bridging portion in opening penetrating direction

The invention claimed is:

1. A bracket that has an opening for attaching an anti-vibration member coupled on one of a vibration generating side and a vibration receiving side and is able to be coupled on the other one of the vibration generating side and the vibration receiving side, wherein:
    the bracket is made of a resin;
    the bracket is a tubular bracket, which has a pair of column portions arranged with an interval therebetween and a pair of bridging portions arranged between the pair of column portions and coupling the pair of column portions, in which the opening is defined by the pair of column portions and the pair of bridging portions;
    the bracket comprises at least one plate portion that extends on a bracket outer circumferential side outer side surface of at least one column portion of the pair of column portions all over the column portion in an extending direction of the column portion and that projects in an extending direction of the bridging portions beyond the column portion;
    one bridging portion of the pair of bridging portions has a bracket outer circumferential side part, a bracket inner circumferential side part, a separating part, and ribs;
    the separating part and the ribs couple the bracket outer circumferential side part to the bracket inner circumferential side part;
    a width of a bracket outer circumferential side outer surface of the bracket outer circumferential side part of the one bridging portion in an opening penetrating direction is maximum at an extending direction end of the bridging portion on a side of the one column portion in a view in an extending direction of the column portions, and
    the width of the bracket outer circumferential side outer surface of the bracket outer circumferential side part of the one bridging portion in the opening penetrating direction becomes narrower from the extending direction end of the bridging portion toward a center of the bridging portion in the extending direction of the bridging portion in the view in the extending direction of the column portions.

2. The bracket according to claim 1, wherein one opening penetrating direction side contour line of a pair of opening penetrating direction side contour lines forming an outline of the bracket outer circumferential side outer surface of the bracket outer circumferential side part of the one bridging portion in a side of the opening penetrating direction is a curve having a depression going toward the other opening penetrating direction side contour line of the pair of opening penetrating direction side contour lines from the extending direction end of the bridging portion toward the center of the bridging portion in the extending direction of the bridging portion in the view in the extending direction of the column portions.

3. The bracket according to claim 2, wherein the other opening penetrating direction side contour line of the bracket outer circumferential side outer surface of the bracket outer circumferential side part of the one bridging portion is a curve having a depression going toward the one opening penetrating direction side contour line from the extending direction end of the bridging portion toward the center of the bridging portion in the extending direction of the bridging portion in the view in the extending direction of the column portions.

4. The bracket according to claim 3, wherein in the view in the extending direction of the column portions, a depth of the depression of the one opening penetrating direction side contour line in the opening penetrating direction is different from a depth of the depression of the other opening penetrating direction side contour line in the opening penetrating direction in the bracket outer circumferential side outer surface of the bracket outer circumferential side part of the one bridging portion.

5. A bracket that has an opening for attaching an anti-vibration member coupled on one of a vibration generating side and a vibration receiving side and is able to be coupled on the other one of the vibration generating side and the vibration receiving side, wherein:
the bracket is made of a resin;
the bracket is a tubular bracket, which has a pair of column portions arranged with an interval therebetween and a pair of bridging portions arranged between the pair of column portions and coupling the pair of column portions, in which the opening is defined by the pair of column portions and the pair of bridging portions;
the bracket comprises at least one plate portion that extends on a bracket outer circumferential side outer side surface of at least one column portion of the pair of column portions all over the column portion in an extending direction of the column portion and that projects in an extending direction of the bridging portions beyond the column portion;
one bridging portion of the pair of bridging portions has a bracket outer circumferential side part, a bracket inner circumferential side part, a separating part, and ribs;
the separating part and the ribs couple the bracket outer circumferential side part to the bracket inner circumferential side part;
a width of a bracket outer circumferential side outer surface of the bracket outer circumferential side part of the one bridging portion in an opening penetrating direction is maximum at an extending direction end of the bridging portion on a side of the one column portion in a view in an extending direction of the column portions, and
the other bridging portion of the pair of bridging portions further includes a flange portion that projects at least from a bracket outer circumferential side outer side surface of the one column portion on an extension of the other bridging portion in the extending direction of the other bridging portion, and the flange portion and the at least one plate portion are coupled to each other.

6. A bracket that has an opening for attaching an anti-vibration member coupled on one of a vibration generating side and a vibration receiving side and is able to be coupled on the other one of the vibration generating side and the vibration receiving side, wherein:
the bracket is made of a resin;
the bracket is a tubular bracket, which has a pair of column portions arranged with an interval therebetween and a pair of bridging portions arranged between the pair of column portions and coupling the pair of column portions, in which the opening is defined by the pair of column portions and the pair of bridging portions;
the bracket comprises at least one plate portion that extends on a bracket outer circumferential side outer side surface of at least one column portion of the pair of column portions all over the column portion in an extending direction of the column portion and that projects in an extending direction of the bridging portions beyond the column portion;
one bridging portion of the pair of bridging portions has a bracket outer circumferential side part, a bracket inner circumferential side part, a separating part, and ribs;
the separating part and the ribs couple the bracket outer circumferential side part to the bracket inner circumferential side part;
a width of a bracket outer circumferential side outer surface of the bracket outer circumferential side part of the one bridging portion in an opening penetrating direction is maximum at an extending direction end of the bridging portion on a side of the one column portion in a view in an extending direction of the column portions, and
the bracket further comprises a reinforcing portion on the bracket outer circumferential side outer surface of the bracket outer circumferential side part of the one bridging portion.

7. The bracket according to claim 6, wherein the reinforcing portion has an inclined end that is inclined in a tapered manner in a direction from the one bridging portion toward the at least one plate portion in the view in the extending direction of the column portions.

8. The bracket according to claim 7, wherein the at least one plate portion comprises two plate portions and the reinforcing portion further extends from a tapered part formed by the inclined end in the extending direction of the column portions between the two plate portions.

9. The bracket according to claim 1, wherein the other bridging portion of the pair of bridging portions further includes a flange portion that projects at least from a bracket outer circumferential side outer side surface of the one column portion on an extension of the other bridging portion in the extending direction of the other bridging portion, and the flange portion and the at least one plate portion are coupled to each other.

10. The bracket according to claim 1, further comprising a reinforcing portion on the bracket outer circumferential side outer surface of the bracket outer circumferential side part of the one bridging portion.

11. The bracket according to claim 2, wherein the other bridging portion of the pair of bridging portions further includes a flange portion that projects at least from a bracket outer circumferential side outer side surface of the one column portion on an extension of the other bridging portion in the extending direction of the other bridging portion, and the flange portion and the at least one plate portion are coupled to each other.

12. The bracket according to claim 2, further comprising a reinforcing portion on the bracket outer circumferential side outer surface of the bracket outer circumferential side part of the one bridging portion.

13. The bracket according to claim 5, further comprising a reinforcing portion on the bracket outer circumferential side outer surface of the bracket outer circumferential side part of the one bridging portion.

14. The bracket according to claim 9, further comprising a reinforcing portion on the bracket outer circumferential side outer surface of the bracket outer circumferential side part of the one bridging portion.

15. The bracket according to claim 10, wherein the reinforcing portion has an inclined end that is inclined in a tapered manner in a direction from the one bridging portion toward the at least one plate portion in the view in the extending direction of the column portions.

* * * * *